(12) United States Patent
Spahn et al.

(10) Patent No.: US 10,562,558 B1
(45) Date of Patent: Feb. 18, 2020

(54) FOLDABLE STEERING WHEEL SYSTEM

(71) Applicant: Ford Global Technologies, LLC, Dearborn, MI (US)

(72) Inventors: Brian Robert Spahn, Plymouth, MI (US); James Robert Chascsa, II, Farmington Hills, MI (US); Michael Joseph Dean, Westland, MI (US); Benjamin Yilma, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/379,012

(22) Filed: Apr. 9, 2019

(51) Int. Cl.
*B62D 1/04* (2006.01)
*B62D 1/06* (2006.01)
*B62D 1/10* (2006.01)

(52) U.S. Cl.
CPC ............... *B62D 1/06* (2013.01); *B62D 1/10* (2013.01); *B62D 1/046* (2013.01)

(58) Field of Classification Search
CPC . B62D 1/04; B62D 1/046; B62D 1/06; B62D 1/08; B62D 1/10; B60R 25/02; B60R 25/0215
See application file for complete search history.

(56) References Cited

U.S. PATENT DOCUMENTS

| | | |
|---|---|---|
| 1,125,539 A | 1/1915 | Horowitz |
| 1,268,505 A | 6/1918 | Sincare |
| 1,459,957 A | 1/1922 | Merritt |
| 1,416,636 A * | 5/1922 | Hanes ...................... B62D 1/04 |
| | | 74/555 |
| 1,722,151 A | 7/1929 | Mantout |
| 1,847,209 A * | 3/1932 | Bolinas, Jr. .......... B60R 25/0224 |
| | | 74/555 |
| 2,155,123 A * | 4/1939 | Gerardy ................... B62D 1/04 |
| | | 74/555 |
| 2,326,131 A | 4/1942 | Eschelbacher |
| 7,441,799 B2 * | 10/2008 | Enders .................. B60R 21/203 |
| | | 280/731 |
| 7,862,084 B2 * | 1/2011 | Maeda ................... B60K 37/00 |
| | | 280/775 |
| 2007/0295151 A1 | 12/2007 | Kentor |
| 2016/0325662 A1 * | 11/2016 | Nash ...................... B60N 3/005 |
| 2016/0375924 A1 * | 12/2016 | Bodtker ................. B62D 1/046 |
| | | 74/552 |
| 2017/0225570 A1 | 8/2017 | El Aile et al. |
| 2017/0297606 A1 * | 10/2017 | Kim ....................... B62D 1/181 |
| 2018/0154921 A1 | 6/2018 | Bonello et al. |
| 2018/0334183 A1 * | 11/2018 | Beauregard ............. B62D 1/06 |

(Continued)

FOREIGN PATENT DOCUMENTS

DE 102005044289 A1 * 3/2007 ......... B60R 25/0224
DE 102010055589 A1 * 6/2012 ............... B62D 1/04

(Continued)

*Primary Examiner* — Adam D Rogers
(74) *Attorney, Agent, or Firm* — Vichit Chea; Price Heneveld LLP (57) ABSTRACT

A powered folding steering wheel system includes a rim having upper and lower rim sections that are pivotably connected to a primary structure to permit rotation of the upper and lower rim sections forwardly and rearwardly from a driving position. The system includes a powered drive assembly that is configured to rotate the upper and lower rim sections forwardly and rearwardly.

20 Claims, 12 Drawing Sheets

(56) References Cited

U.S. PATENT DOCUMENTS

2019/0176868 A1* 6/2019 Kreutz .................... B62D 1/08
2019/0185041 A1* 6/2019 Shin ........................ B62D 1/04

FOREIGN PATENT DOCUMENTS

| DE | 102017209499 A1 * | 12/2018 | ................ B62D 1/04 |
| FR | 2779695 A1 * | 12/1999 | ............. B60K 35/00 |
| JP | 01111566 A * | 4/1989 | |
| WO | 03020571 A1 | 3/2003 | |
| WO | WO-2017060149 A1 * | 4/2017 | ............. B60R 25/02 |
| WO | WO-2018073518 A1 * | 4/2018 | ................ B62D 1/06 |
| WO | WO-2018073526 A1 * | 4/2018 | ................ B62D 1/06 |

* cited by examiner

FOLDABLE STEERING WHEEL SYSTEM

FIELD OF THE INVENTION

The present invention generally relates to a reconfigurable steering wheel, and in particular to a steering wheel having upper and lower rim sections that can be independently moved in forward and rear directions.

BACKGROUND OF THE INVENTION

Steering wheels for motor vehicles and the like typically include a central portion that is connected to a steering column, a rim that is configured to be grasped and rotated by a user during vehicle operation, and one or more spokes or other structure that interconnects the rim to the central portion. However, known steering wheels may suffer from various drawbacks.

SUMMARY OF THE INVENTION

One aspect of the present disclosure is a powered folding steering wheel system including a steering wheel having a primary structure. The primary structure includes a central portion and connecting structure such as spokes. The central portion is configured to mount to a steering column that is forward of the steering wheel. The steering wheel includes a rim connected to the central portion by the spokes. The rim includes an upper section having opposite ends that are pivotably connected to the primary structure to permit rotation forwardly and rearwardly from a home or driving position. The rim further includes a lower rim section having opposite ends that are pivotably connected to the primary structure to permit rotation of the lower rim section forwardly and rearwardly from a home or driving position. The upper and lower rim sections may optionally be substantially planar when the upper and lower rim sections are in the driving positions. The system includes one or more powered actuators such as an electrically powered drive assembly that is configured to independently rotate the upper and lower rim sections forwardly and rearwardly from their respective driving positions. The upper and lower rim sections can be simultaneously positioned in their respective forward positions, and the upper and lower rim sections may also be simultaneously positioned in their respective rearward positions. The upper and lower rim sections may also be simultaneously positioned in their respective driving or use positions.

The invention may include any one or a combination of the following features:

The electrically powered drive assembly may include one or more electric motors, such as a first electric motor that is operably connected to the upper rim section and a second electric motor that is operably connected to the lower rim section.

The system may include first and second ninety degree gear drives operably interconnecting the first and second motors to the upper and lower rim sections, respectively.

One or more of the first and second ninety degree gear drives may include a worm gear that engages a pinion gear such that the rim sections remain at a selected position when the first and second electric motors are not actuated.

One or both of the first and second electric motors may be mounted to the central portion of the steering wheel.

The gear drives may include first and second pinion gears, respectively, and the first pinion gear may be connected to a first shaft whereby rotation of the first shaft causes rotation of the upper rim section, and the second pinion gear may be connected to a second shaft whereby rotation of the second shaft causes rotation of the lower rim section.

Alternatively, the system may include first and second inline gear drives operably interconnecting the first and second electric motors to the upper and lower rim sections, respectively.

The lower rim section may be rotatable rearwardly to a substantially horizontal support position while the upper rim section remains in an upright driving position whereby the lower rim section can be utilized to support an article (e.g. a tablet or laptop computer).

When the lower rim section is rotated rearwardly to a substantially horizontal position, the upper rim section may be rotated rearwardly to a position that is parallel to the lower rim section or angled somewhat (e.g. 10-30 degrees) relative to the lower rim section.

One or both of the upper and lower rim sections may, optionally, be rotated forwardly to stowage positions. Both the upper and lower rim sections may extend forwardly and be disposed at an acute angle relative to one another.

The system may optionally include one or more powered locking mechanisms that are configured to lock one or more of the upper and lower rim sections in the respective driving positions of the rim sections.

The powered locking mechanisms may comprise solenoids that shift pins between locked and unlocked positions.

The central portion steering wheel may include an airbag module, and the powered locking mechanisms may be configured to generate a signal to deactivate the airbag module if the locking mechanisms are not locked and/or if the rim sections are not in their driving positions.

At least a selected one of the upper and lower rim sections may be operably connected to the primary structure by a ratchet mechanism having at least one releasable pawl that permits rotation of the selected rim section in only a first direction when the pawl is engaged.

The system may optionally include first and second releasable pawls that can be selectively engaged to prevent rotation of the selected rim section in both first and second opposite directions, or to prevent rotation in only the first direction, or to prevent rotation in only the second direction.

The spoke structures may optionally have outer ends that are disposed at 9 o'clock and 3 o'clock positions of the rim.

The system may include a user input and a controller that is operably connected to the user input. The controller may be configured to store and/or retrieve one or more stored steering wheel configurations whereby a user can select a stored steering wheel configuration utilizing the user input to thereby cause the controller to shift the steering wheel to the desired configuration.

Another aspect of the present disclosure is a powered folding steering wheel system including a steering wheel having a primary structure and a rim. The rim forms a substantially continuous ring that is pivotably connected to the primary structure. The system includes a powered actuator such as an electric motor that is configured to rotate the rim from an upright use position to a substantially horizontal stowed position. A forward side of the primary structure may be configured to mount to a steering column. During rotation of the rim from the use position to the stowed position, an upper portion of the rim moves forwardly while a bottom portion of the rim moves rearwardly.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
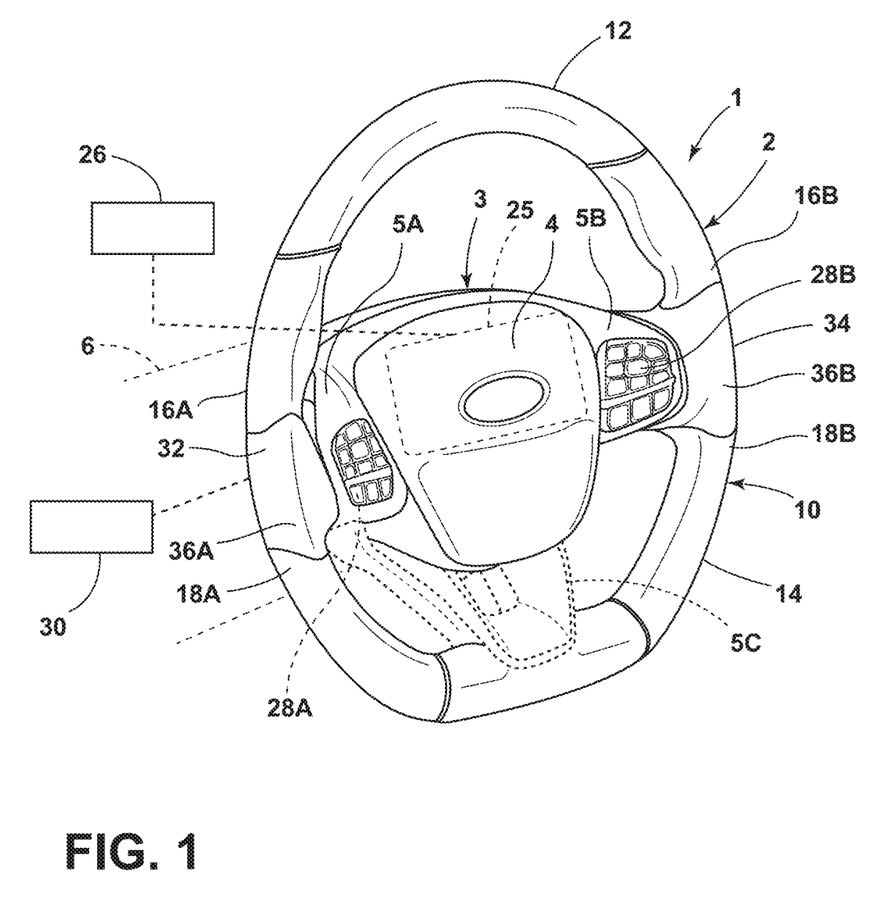
FIG. 1 is an isometric view of a steering wheel according to one aspect of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 3:
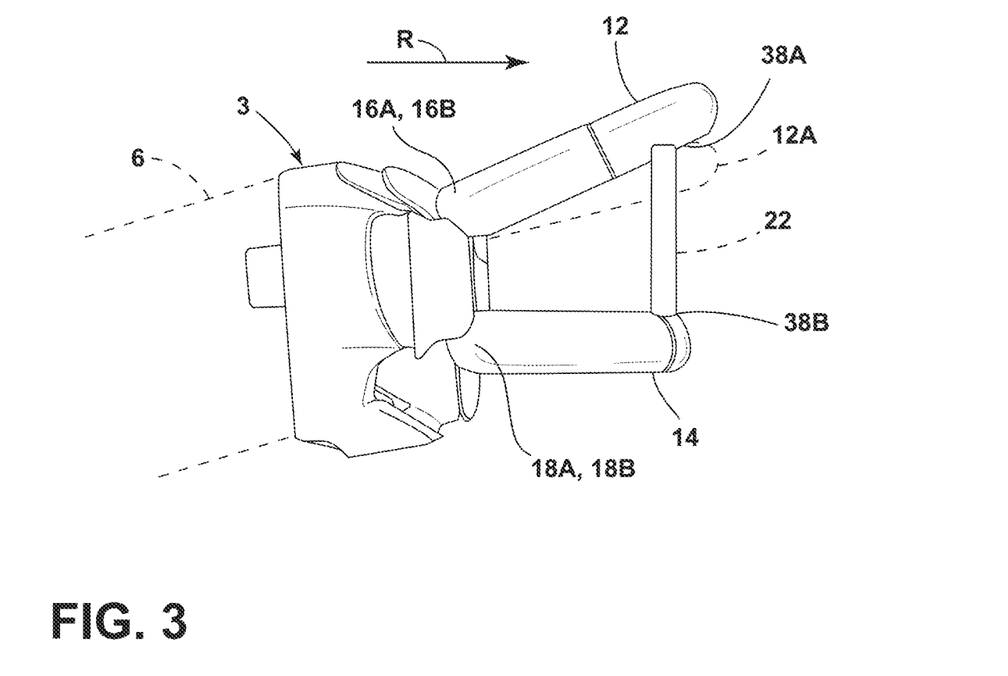
FIG. 3 is a side elevational view of the steering wheel of FIG. 2.

With reference to FIG. 1, a powered folding steering wheel system 1 according to one aspect of the present disclosure comprises a steering wheel 2 having a primary structure 3. The primary structure 3 includes a central portion 4 and one or more structures such as spokes 5A-5C. The central portion 4 is configured to mount to a steering column 6 that is generally forward of the steering wheel 2. The steering wheel 2 includes a rim 10 that is connected to the central portion 4 by the spokes 5A and 5B. Powered folding steering wheel system 1 may optionally include a third, center spoke 5C. The rim 10 includes an upper rim section 12 and a lower rim section 14. The upper rim section 12 has opposite ends 16A and 16B that are pivotably connected to the primary structure 3 to permit rotation in a forward direction "F" (FIG. 8) and rearwardly in a rearward direction "R" (FIG. 3) from the upright driving or home position of FIG. 1. The lower rim section 14 has opposite ends 18A and 18B that are pivotably connected to the primary structure 3 to permit rotation of lower rim section 14 forwardly (FIG. 8) and rearwardly (FIG. 3) from a generally upright driving or home position (FIG. 1). When the steering wheel 1 is configured for driving as shown in FIG. 1, the upper and lower rim sections 12 and 14 may be coplanar or approximately coplanar.

As discussed in more detail below, the steering wheel system 1 may include an electrically powered drive assembly. For example, the electrically powered drive assembly may include one or more electric motors 20A and 20B (FIGS. 9A-9D) that are operably connected to a controller 30. The electric motors 20A and 20B may be configured to independently rotate the upper and lower rim sections 12 and 14, respectively, forwardly and rearwardly from their respective driving positions (FIG. 1) when a signal is received from controller 30. The upper and lower rim sections 12 and 14 may be simultaneously positioned in their respective forward positions (e.g. FIGS. 7 and 8). The upper and lower rim sections 12 and 14 may also be simultaneously positioned in their respective rearward positions (e.g. FIGS. 2 and 3). The upper and lower rim sections 12 and 14, respectively, may also be simultaneously positioned in their respective driving or home positions (e.g. FIG. 1).

Referring again to FIG. 1, the steering wheel system 1 may include an airbag module 25 (see also FIGS. 9A-9D) that is operably connected to a restraints control module (RCM) 26. As discussed in more detail below, the RCM 26 is configured to actuate the airbag module 25 during an accident or other such event. However, the steering wheel system 1 may be configured to prevent actuation of airbag module 25 by RCM 26 if one or both of the rim sections 12, 14, are not in the driving position of FIG. 1. The RCM 26 may be operably connected to controller 30. Controller 30 may comprise a control system that includes one or more processors and other components that are operably interconnected via one or more data buses.

Also, the steering wheel system 1 may include one or more push button inputs 28A, 28B on the spokes 5A and 5B, respectively, to provide for operation of various vehicle features (e.g. cruise control, etc.), and for control of the position and movement of the rim sections 12 and 14. As discussed in more detail below, controller 30 is configured to receive inputs from a user via one or more inputs 28A, 28B, or other suitable input and to actuate the powered actuators (e.g. electric powers 20A and 20B) to move the upper and lower rim sections 12 and 14 to a desired position selected by a user. Outer ends 36A and 36B of spokes 5A and 5B, respectively, may be substantially continuous with the adjacent surfaces of the upper and lower rim sections 12 and 14. The spokes 5A and 5B may extend from a central portion 4 to the rim 10 at 9 o'clock and 3 o'clock positions 32 and 34, respectively. However, it will be understood that the spokes 5A-5C could have alternative configurations, and the present disclosure is not limited to any specific size, shape, or location.

Figure 2:
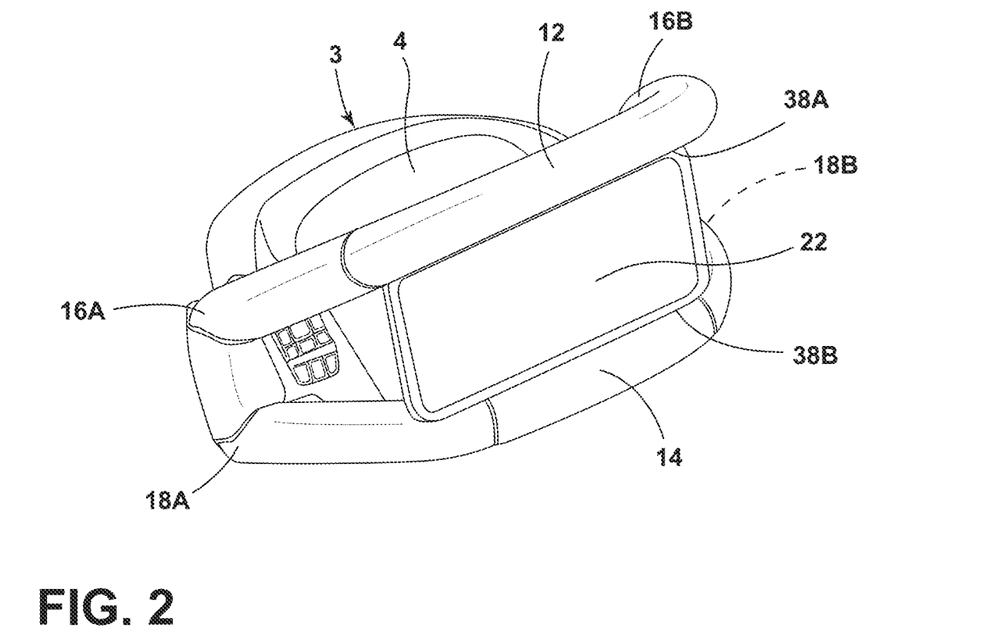
FIG. 2 is an isometric view of the steering wheel of FIG. 1 wherein the upper and lower rim sections are folded rearwardly to hold an object such as a large smartphone.

With reference to FIG. 2, the upper and lower rim sections 12 and 14 may both be shifted rearwardly to thereby support an article such as a smartphone 22 between the rim sections 12 and 14. The upper and lower rim sections 12 and 14 may be rotated to virtually any angular desired position to thereby accommodate articles such as smartphones, tablet computers, and the like of different sizes. The upper and lower sections 12 and 14 may comprise a flexible outer surface and compressible internal padding (e.g. foam) to thereby resiliently retain the article 18B at compressed regions 38A and 38B of rim 10. As discussed in more detail below, a plurality of configurations (i.e. positions of rim sections 12 and 14) may be stored by controller 30, and a user can select a stored configuration to thereby cause the rim sections 12 and 14 to move to a specific configuration as may be required to hold a particular article 18B. For example, a particular user may use one or more inputs to rotate rim sections 12 and 14 until the user's phone 22 is properly supported. An input button can then be actuated to store the specific configuration (positions of rim sections 12 and 14). The user can then select the configuration at a later time to again support a specific phone 22.

Figure 4:
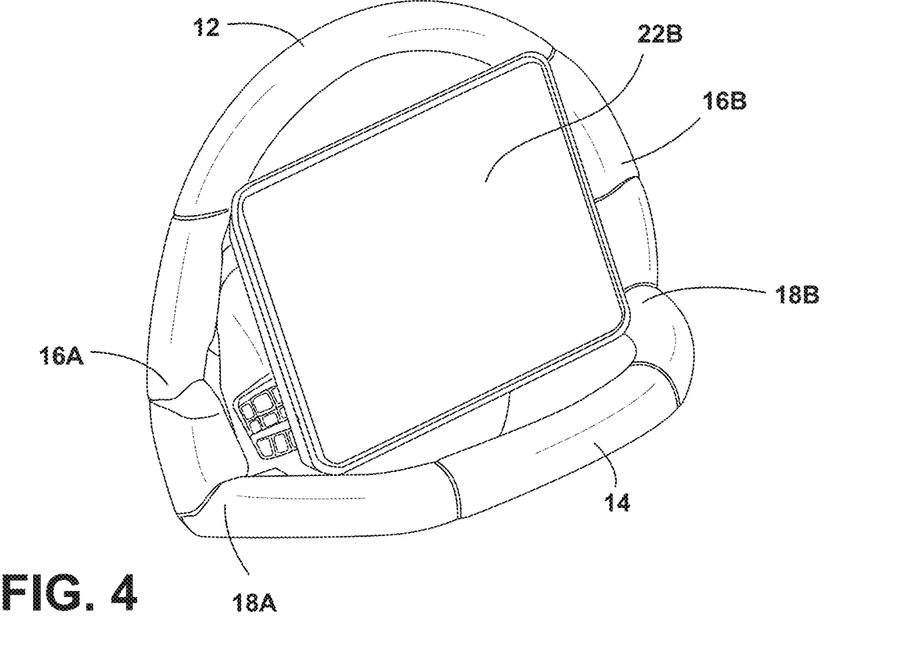
FIG. 4 is an isometric view of the steering wheel wherein the lower rim section is folded rearwardly to support an item such as a tablet or laptop computer.
Figure 5:
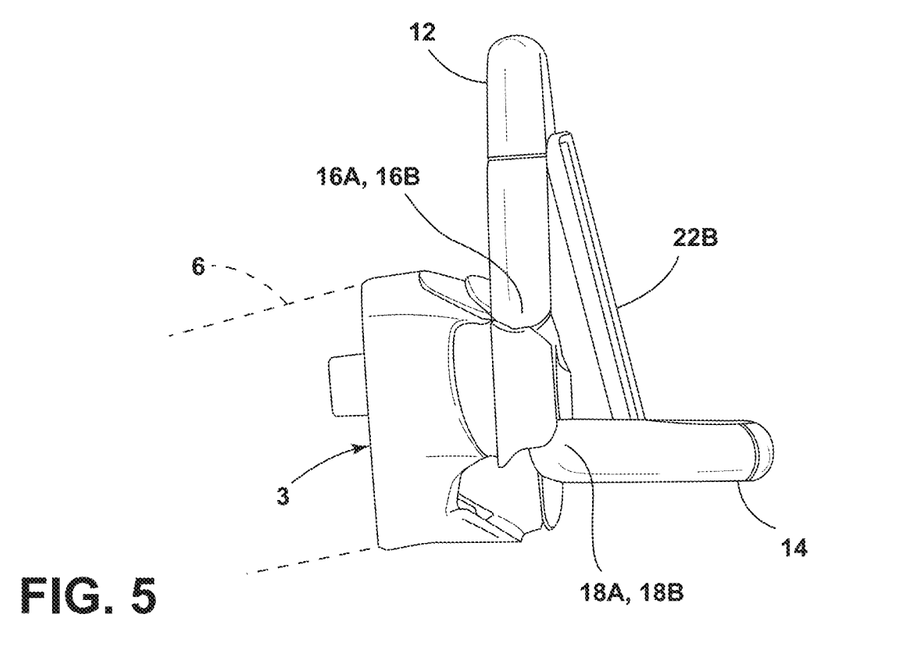
FIG. 5 is a side elevational view of the steering wheel of FIG. 4.

With reference to FIGS. 4 and 5, the steering wheel system 1 may also be configured to support or retain other items such as a computer 22B. The computer 22B may comprise a tablet or laptop type computer. In FIGS. 4 and 5, the lower rim section 14 is shifted to a generally horizontal position in the rearward direction and the upper rim section 12 is in a home or driving upright position. This permits the item 22B to be supported on the steering wheel in a position that is readily visible to a user in a driver's seat. As noted above, the airbag module 25 may be disabled when one or more of the rim sections 12 and 14 are not in the driving positions.

Figure 6:
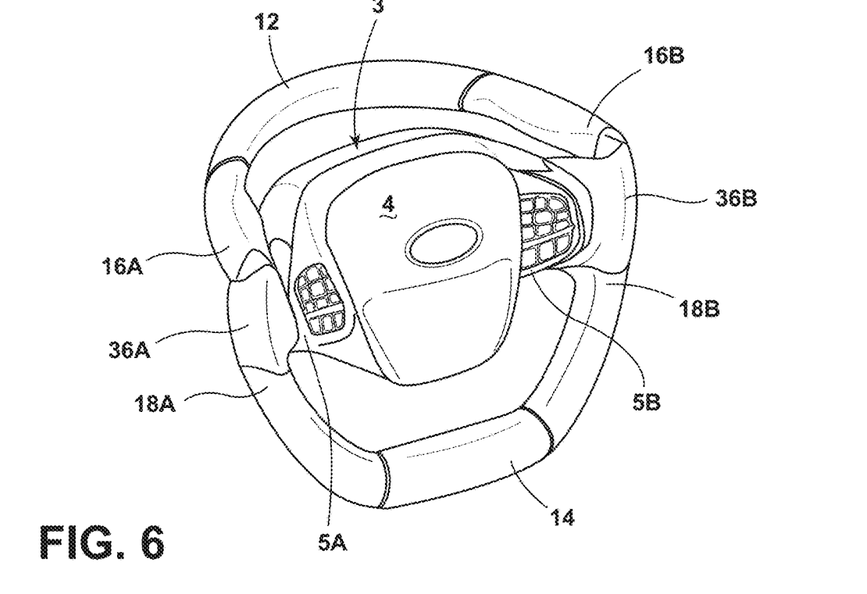
FIG. 6 is an isometric view of the steering wheel with the upper rim section folded forwardly for stowage, and wherein the lower rim section is in a home or driving position.

As shown in FIG. 6, the upper rim section 12 may be rotated to a forward position while the lower rim section 14 remains in an upright driving position. In general, the upper and lower rim section 12 and 14 may be stopped and locked in position at any angle including fully forward positions (FIG. 8), fully rearward positions (FIG. 3), or any angle therebetween. Also, the upper and lower rim sections 12 and 14 can be moved independently, such that virtually any number of configurations can be utilized as may be required by a particular user or situation.

Figure 7:
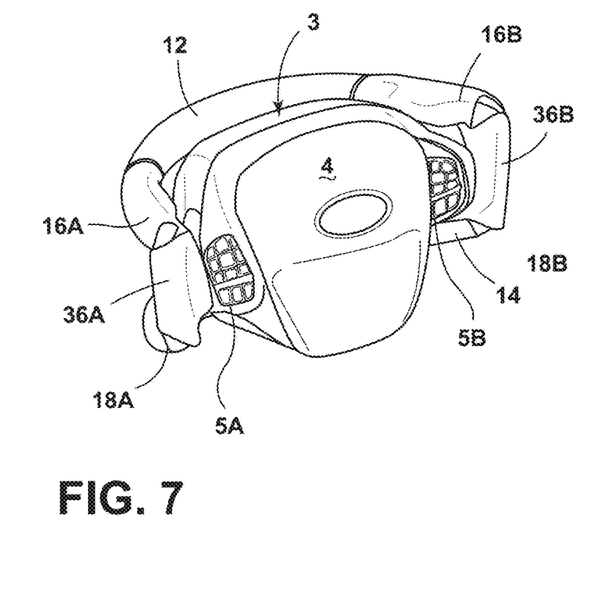
FIG. 7 is an isometric view of the steering wheel with the upper and lower rim sections folded forward for stowage.
Figure 8:
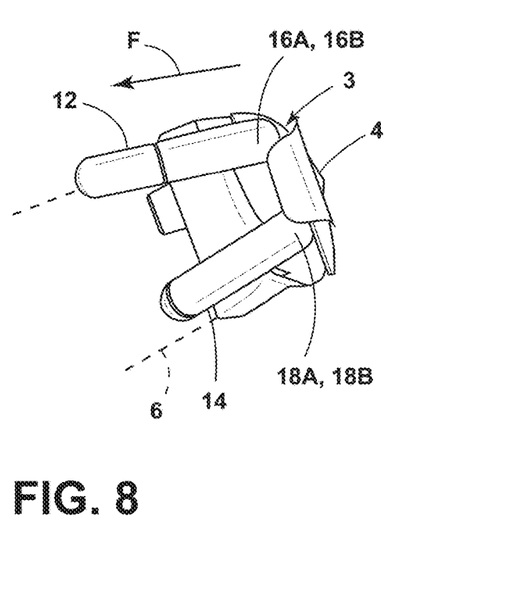
FIG. 8 is a side elevational view of the steering wheel of FIG. 7.

If required, the upper rim section 12 may be moved forwardly for stowage as shown in FIG. 6 while the lower rim section remains in a driving position. Also, as shown in FIGS. 7 and 8, the upper and lower rim sections may both be shifted forwardly for stowage.

Figure 9A:
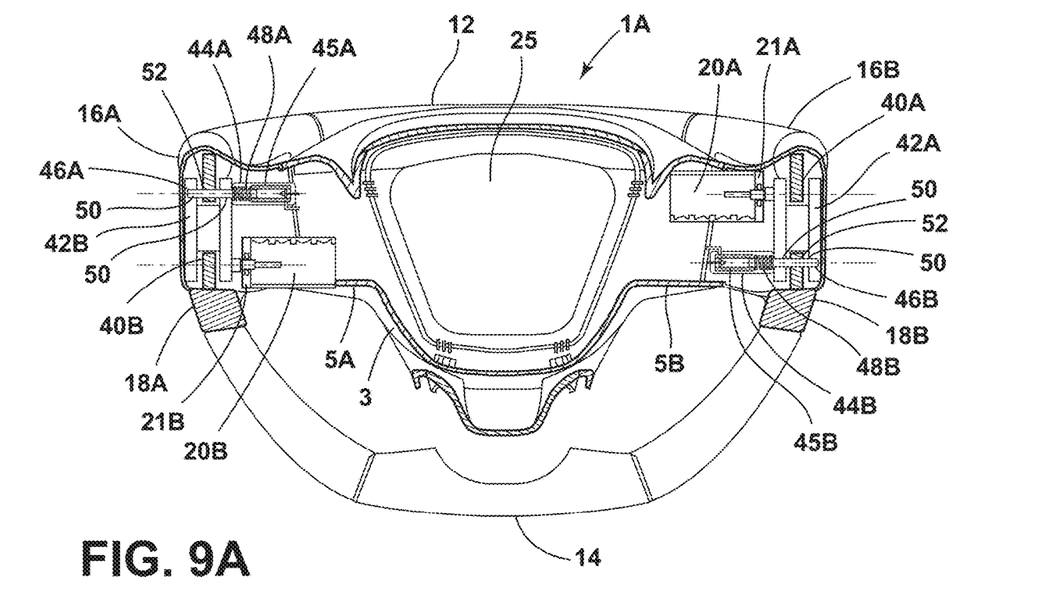
FIG. 9A is a cross-sectional view of a steering wheel according to one aspect of the present disclosure.

With reference to FIG. 9A, a steering wheel system 1A according to one aspect of the present disclosure includes a first electric motor 20A that provides for powered rotation of the upper rim section 12 and a second electric motor 20B that provides for powered rotation for lower rim section 14. The upper rim section 12 may be pivotably connected to bracket or pivot structure 42A by a shaft 40A and lower rim section 14 may be pivotably connected to the pivot structures 42A and 42B by a shaft 40B. Pivot structures 42A and 42B (see also FIG. 10) may be fixed to spokes 5A and 5B, respectively, of primary structure 3, and the electric motors 20A and 20B may also be mounted to the spokes 5A and 5B of primary structure 3. Electric motors 20A includes an inline gear drive 20A that is configured to provide for powered rotation of the shaft 40A to thereby rotate upper rim section 12 upon actuation of electric motor 20A. Similarly, electric motor 20B includes an inline gear drive 21B that drives shaft 40B to thereby rotate lower rim section 14 upon actuation of electric motor 20B.

Figure 10:
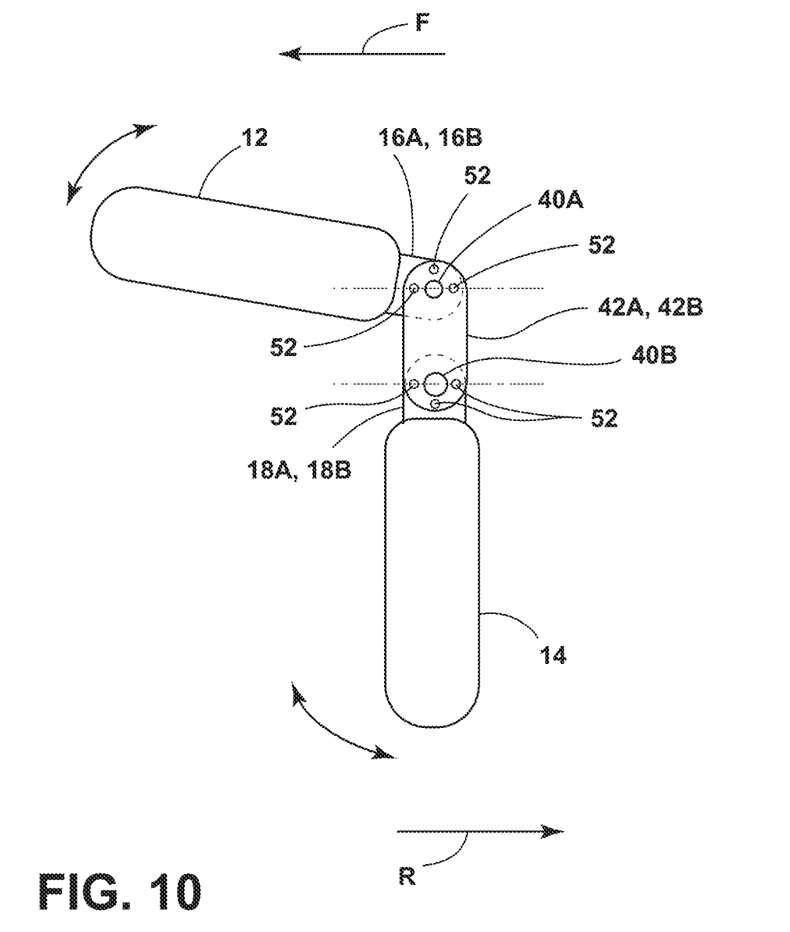
FIG. 10 is a partially schematic side view showing rotation of the upper and lower rim sections.

The steering wheel system 1A may include powered lock mechanisms such as solenoid pin locks 44A and 44B that are configured to rigidly lock the rim sections 12 and 14 in a desired position. As discussed below in connection with FIG. 15A, the powered pin locks 44A and 44B include pins 46A and 46B that extend through openings 50 in pivot structures 42A and 42B, and through openings 52 of the opposite ends of the upper and lower rim sections 12 and 14. As shown in FIG. 10, the ends of the upper and lower rim sections 12 and 14 may include a plurality of openings 52 at a plurality of radial positions to thereby permit the upper and lower rim sections 12 and 14 to be locked at various angular positions. The number of openings 52 and the locations of openings 52 may be selected to provide for locking rim sections 12 and/or 14 at any angular position required. At least one of the openings 52 is preferably configured to lock the upper and lower rim sections 12 and 14 in the driving position (FIG. 1).

In use, solenoid 45A of solenoid lock 44A can be actuated to retract pin 46A to thereby permit rotation of upper rim section 12 upon actuation of electric motor 20A. If solenoid 45A is deactivated, spring 48A biases pin 46A into engagement with openings 50 and 52, and the pin 46A therefore locks upper rim section 12 in place once the openings 50 and 52 are aligned to permit the pin 46A to shift through the openings 50 and 52. The solenoid 45B can be actuated in a similar manner to retract pin 46B to permit rotation of lower rim section 14 upon actuation of electric motor 20B, and spring 48B causes pin 46B to engage openings 50 and 52 when the openings are aligned to thereby lock the lower rim section 14 in a desired location. It will be understood that the upper and lower rim section 12 and 14 may be positioned at angles wherein the openings 50 and 52 are not aligned, such that the pin locks 44A and 44B do not lock the rim sections 12 and 14 at a specific angle.

Figure 15A:
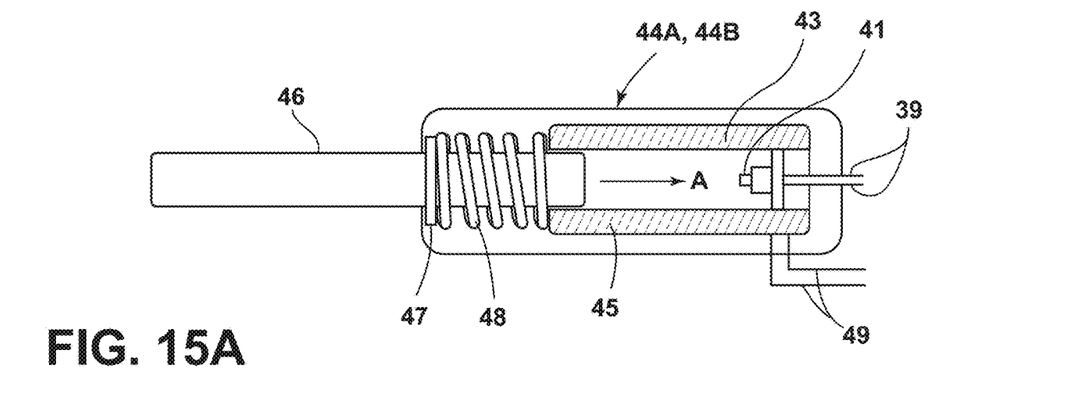
FIG. 15A is a partially fragmentary cross-sectional view of a locking solenoid mechanism of the steering wheel of FIG. 9A.

With reference to FIG. 15A, the solenoid pin lock mechanisms 44A and 44B may be substantially identical and each may include a spring 48 that engages a washer or disk 47 fixed to pin 46. When power is applied to solenoid circuit 49, electromagnet 43 is actuated to thereby pull the pin 46 inwardly in the direction of the arrow "A," thereby compressing spring 48 and actuating switch 41 to thereby cause the signal to travel through circuit 39 to the controller 30. When power is removed from the electromagnet 43, pin 46 is released, and spring 48 pushes the pin 46 outwardly (opposite the direction of the arrow "A"), and the switch 41 is deactivated.

Figure 9B:
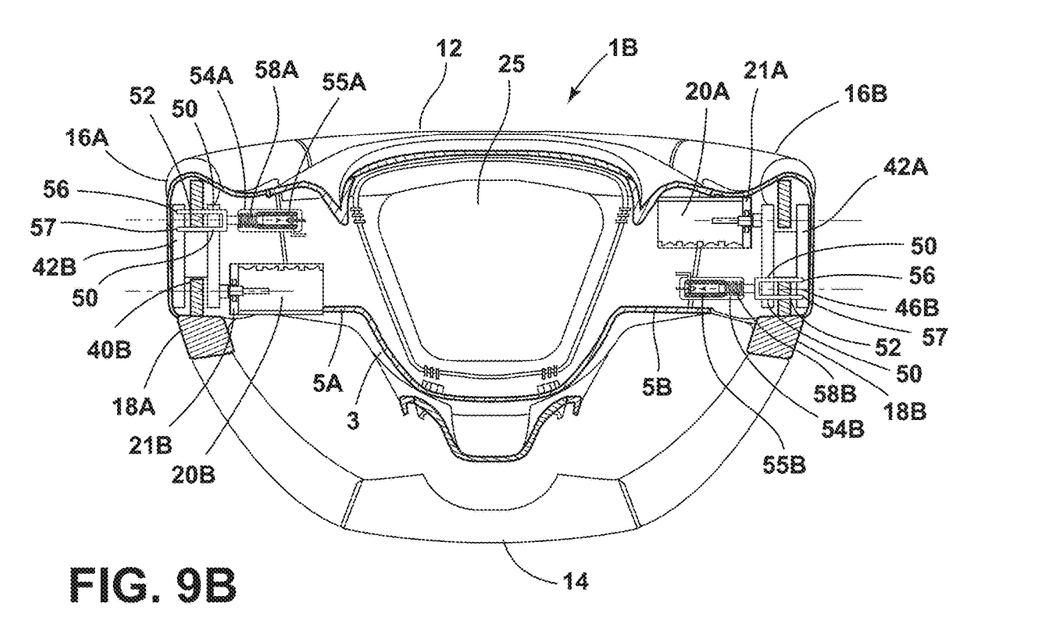
FIG. 9B is a cross-sectional view of a steering wheel according to another aspect of the present disclosure.

With further reference to FIG. 9B, steering wheel system 1B according to another aspect of the present disclosure includes electric motors 20A and 20B that are configured to drive and rotate the upper and lower rim sections 12 and 14 in a manner that is substantially similar to the arrangement of FIG. 9A. The steering wheel system 1B includes powered pin locks 54A and 54B that are somewhat similar to the solenoid pin locks 44A and 44B of FIG. 9A. The powered pin locks 54A and 54B include springs 58A and 58B, respectively, and solenoids 55A and 55B, respectively. The solenoid pin locks 54A and 54B include a pair of pins 56 and 57 that can be retracted upon actuation of the solenoids 55A and 55B. The pins 56 and 57 are configured to simultaneously engage a plurality of openings 50 and 52 in bracket structures 42A and 42B and in the ends of the rim sections 12 and 14 to thereby lock the rim sections 12 and 14 at a desired angle. The use of dual pins 56 and 57 provides for a secure rotation of the lock of the positions of the rim sections 12 and 14.

Figure 15B:
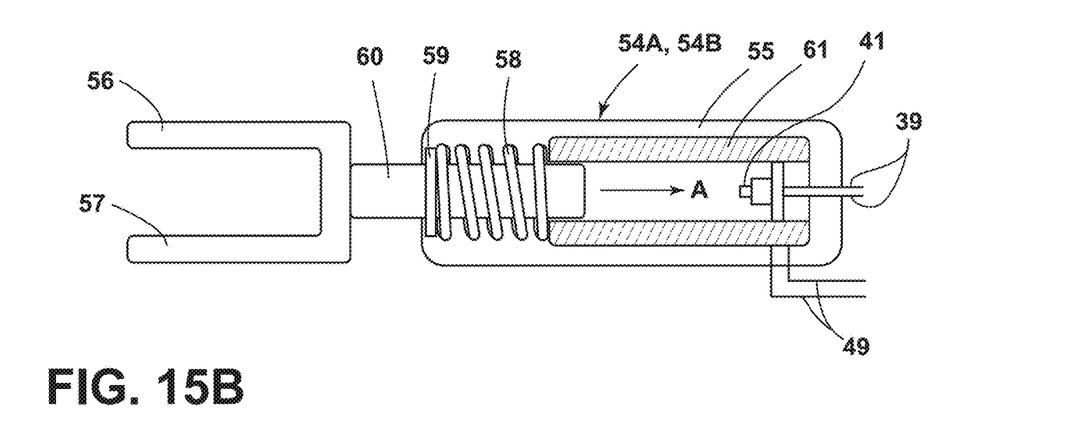
FIG. 15B is a partially fragmentary cross-sectional view of a locking solenoid mechanism of the steering wheel of FIG. 9B.

With further reference to FIG. 15B, the solenoid pin lock mechanisms 54A and 54B may be substantially identical and may include a washer or disk 59 that is fixed to shaft 60. The locking pins 56 and 57 are fixed to the shaft 60. When power is applied to solenoid circuits 49, electromagnets 61 of solenoid 55 pull pin shaft 60 inwardly, thereby compressing spring 58 and actuating internal switch 41 to thereby generate a signal over a circuit 39 to controller 30. When power is removed from the electromagnet 61, pin shaft 60 is released, and spring 58 pushes the shaft 60 outwardly, and internal switch 41 is deactivated.

Figure 9C:
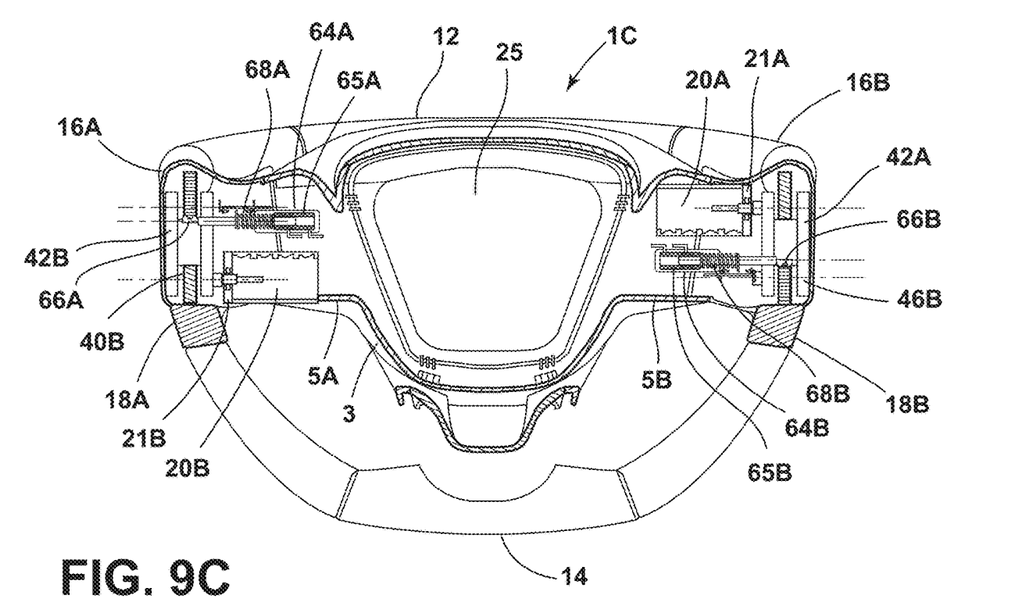
FIG. 9C is a cross-sectional view of a steering wheel according to another aspect of the present disclosure.
Figure 16A:
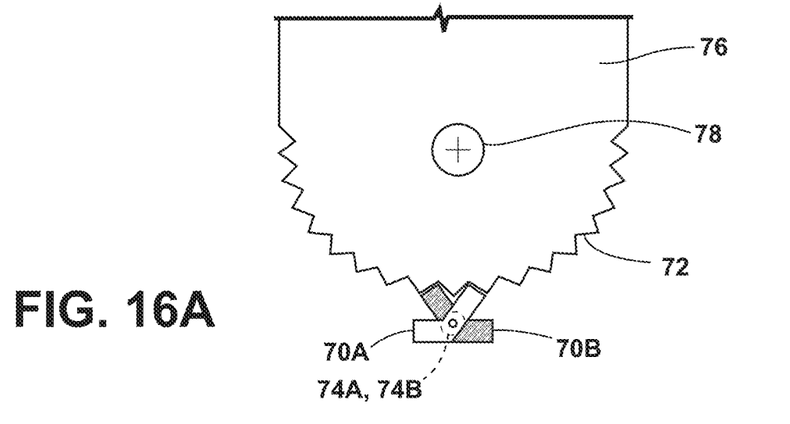
FIG. 16A is a partially schematic view of a ratchet mechanism of the steering wheel of FIG. 9C showing first and second pawls in engaged positions that prevent rotation of a rim section in first and second directions.
Figure 16B:
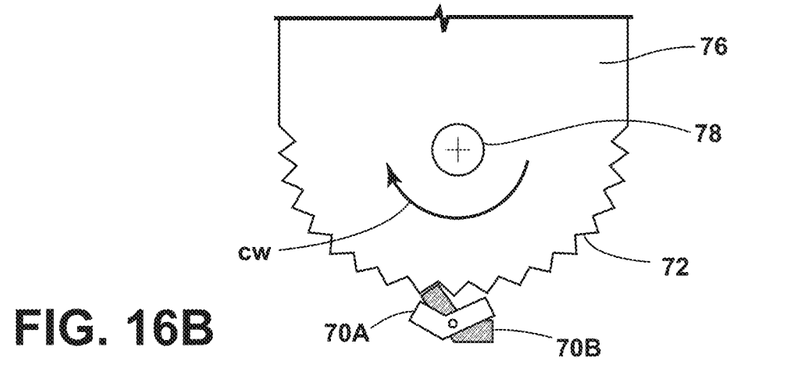
FIG. 16B is a partially schematic view of the ratchet mechanism of FIG. 16A showing one pawl in an engaged position and the other pawl in a disengaged position to thereby permit rotation in a first direction while preventing rotation in the opposite direction.
Figure 16C:
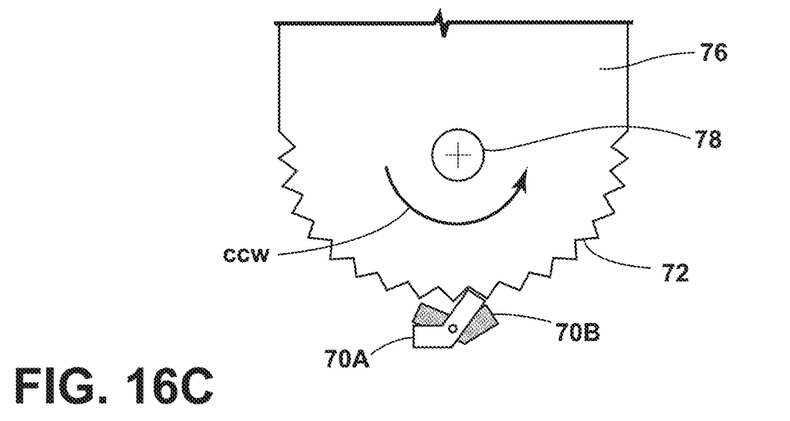
FIG. 16C is a partially schematic view showing one pawl in an engaged position and the other pawl in a disengaged position to thereby prevent rotation of first direction while permitting rotation in the opposite direction.

With further reference to FIG. 9C, a steering wheel system 1C according another aspect of the present disclosure includes electric motors 20A and 20B that provide for powered rotation of the upper and lower rim sections 12 and 14, respectively, in a manner that is substantially similar to the steering wheel systems 1A and 1B of FIGS. 9A and 9B, respectively, as described above. The steering wheel system 1C includes powered lock mechanisms 64A and 64B, including solenoids 65A and 65B, respectively, that can be actuated to shift pins 66A and 66B, respectively. Actuation of solenoids 65A and 65B shifts pins 66A and 66B to thereby control engagement of pawls 70A and 70B with teeth 72 as shown in FIGS. 16A-16C.

Figure 15C:
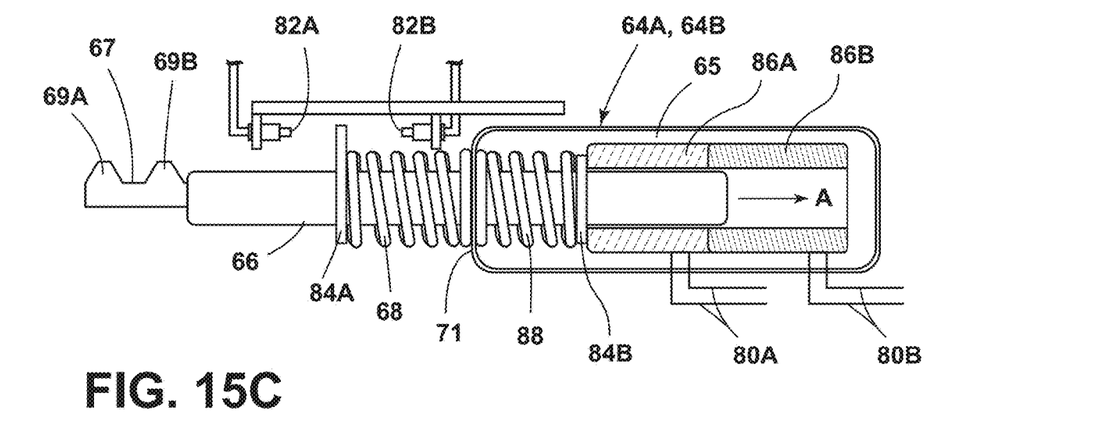
FIG. 15C is a partially fragmentary cross-sectional view of a locking solenoid mechanism of the steering wheel of FIG. 9C.

Specifically, with reference to FIG. 15C, the solenoid lock mechanisms 64A and 64B may be substantially identical and may include a solenoid 65 that shifts a pin 66 having an end 67 with protrusions 69A and 69B. The pawls 70A and 70B are biased towards a locked position (FIG. 16A) by torsion springs 74A and 74B, respectively. The pawls 70A and 70B are configured to engage teeth 72 on an end 76 of upper ring section 12 or lower rim section 14. The rim sections 12 and 14 are pivotably mounted to a pin 78 or other suitable structure of the primary structure 3. The solenoid 65 (FIG. 15C) can be actuated to shift the pin 66 inwardly or outwardly, to thereby cause the protrusions 69A and 69B to selectively engage the pawl 70A and/or 70B to thereby selectively rotate pawl 70A to a disengaged position (FIG. 16B) or to rotate pawl 70B to a disengaged position (FIG. 16C). When both pawls 70A and 70B are engaged as shown in FIG. 16A, the end 76 of rim section 12 or 14 cannot rotate in a clockwise or counter clockwise direction about the pin structure 78. However, with reference to FIG. 16B, if the first pawl 70A is disengaged and the second pawl 70B is engaged, the end 76 can rotate in a clockwise direction ("CW") about pin 78. With reference to FIG. 16C, if first pawl 70B is engaged and second pawl 70B is disengaged, the end 76 can rotate in a counter clockwise direction ("CCW") about pin 78.

Solenoid 65 (FIG. 15C) can be selectively actuated utilizing first and second solenoid circuits 80A and 80B, respectively, to selectively shift the pin 66 inwardly or outwardly as required. Springs 68 and 88 engage housing 71 and washers or disks 84A, 84B, respectively which are fixed to pin 66. The mechanisms 64A, 64B may each include switches or sensors 82A and 82B that may be configured to generate a signal when contacted by a washer or other structure 84 of pin 66 to thereby generate a signal to the controller 30 (FIG. 1) concerning the location of the pin 66 and the state of the pawls 70A and 70B.

During operation, power can be applied to solenoid circuit 80B to activate an electromagnet 86B to retract pin 66 and compress spring 68 and cause washer 84 to contact and activate switch 82B. If power is removed from solenoid circuit 80B, the bias from spring 68 causes pin 66 to shift outwardly to a central and rest position in which switch 82B is deactivated. If electric power is applied to solenoid circuit 80A to activate electromagnet 86A, pin 66 is shifted outwardly, thereby compressing internal spring 88 and activating switch 82A. If power is removed from solenoid circuit 80A, electromagnet 86A is deactivated, releasing pin 66 such that tension and internal spring 88 shifts the pin 66 back to a neutral or rest position such that switch 82A is deactivated. When pin 66 is shifted inwardly in direction of arrow "A" (FIG. 15C), protrusion or rocker 69A disengages ratchet pawl 70B (FIG. 16C) to allow the end 76 of rim 12 or 14 to rotate in a counter clockwise direction. When pin 66 is shifted outwardly (opposite arrow "A"), the protrusion or rocker 69B disengages ratchet pawl 70A (FIG. 16B) to allow the end 76 of rim section 12 or 14 to rotate in a clockwise direction.

Figure 9D:
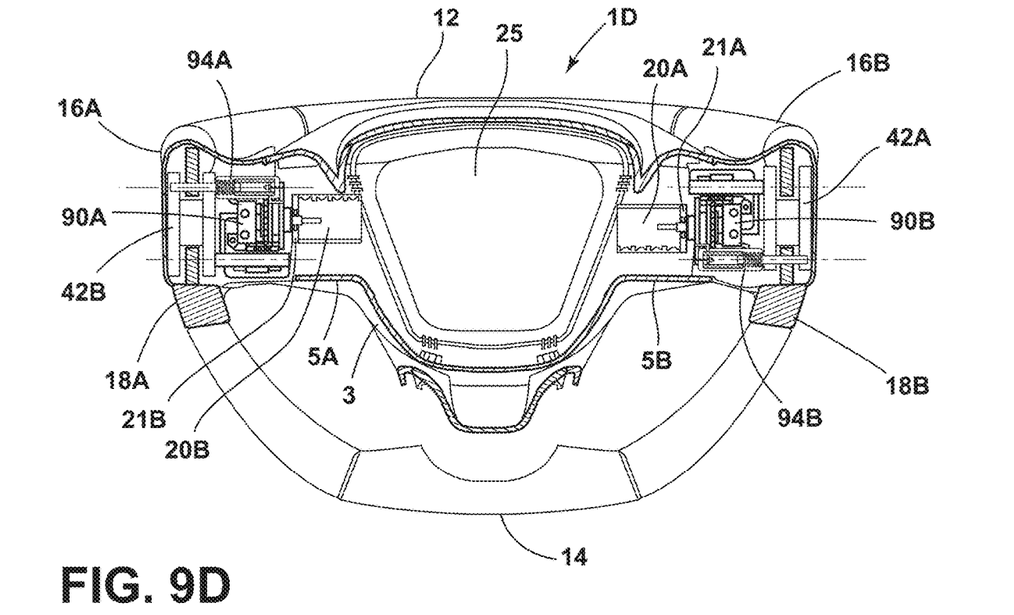
FIG. 9D is a cross-sectional view of a steering wheel according to another aspect of the present disclosure.

With further reference to FIG. 9D, a steering wheel system 1D according to another aspect of the present disclosure includes electric motors 20A and 20B that are configured to rotate upper and lower rim sections 12 and 14 via ninety degree gear drives 90A and 90B. The steering wheel system 1D includes solenoid pin locks 94A and 94B. The solenoid pin lock mechanism 94A and 94B may be substantially similar to one or more of the solenoid mechanisms shown in FIGS. 15A, 15B, and 15C.

Figure 11:
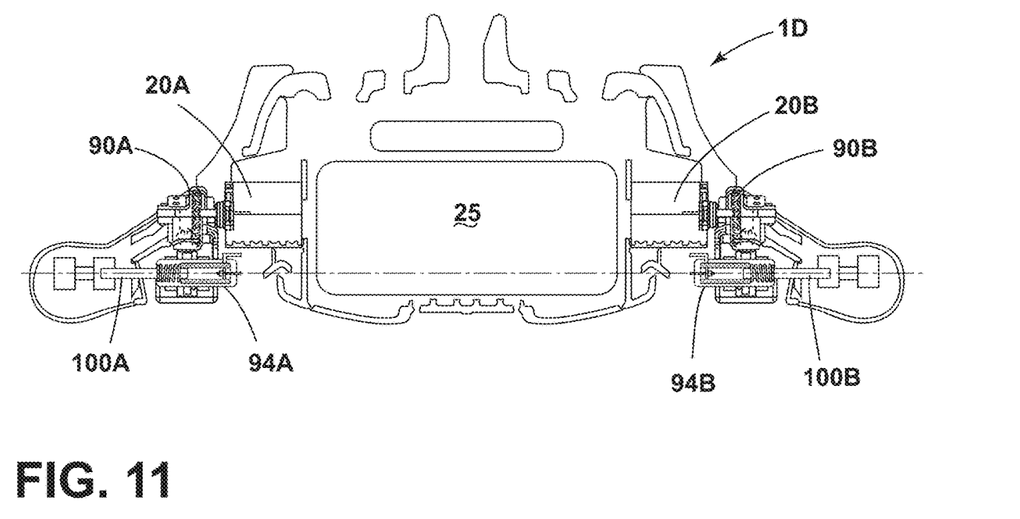
FIG. 11 is a cross-sectional view of a steering wheel having upper and lower sections and a ninety degree gear drive and locking solenoid pins.
Figure 11A:
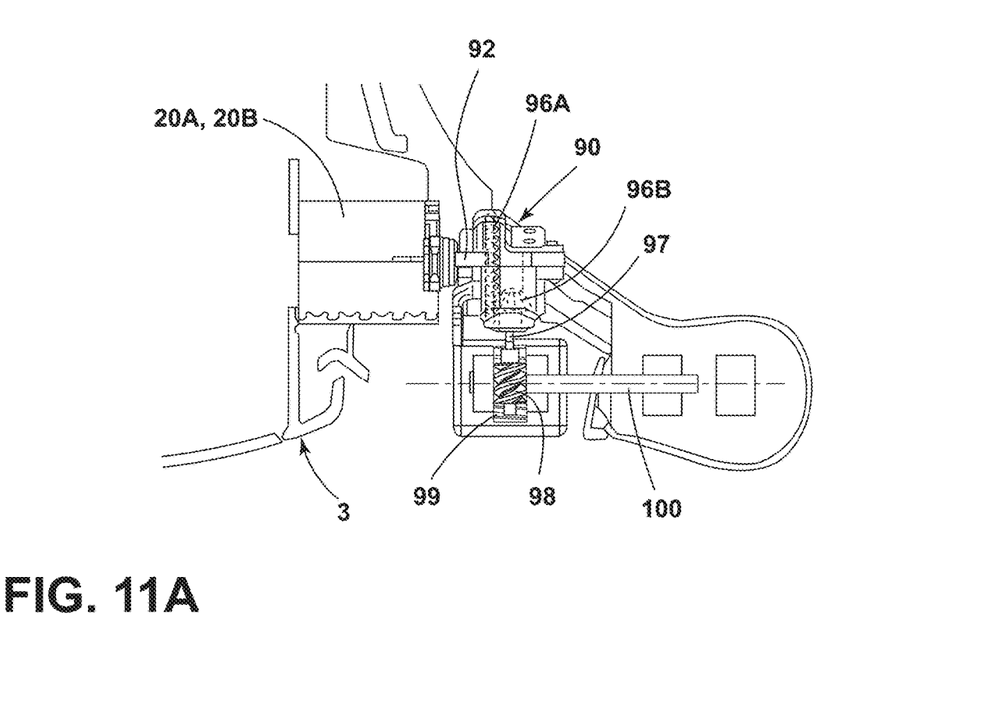
FIG. 11A is a partially fragmentary enlarged view of a ninety degree gear drive and solenoid pin locking mechanism according to another aspect of the present disclosure.

With further reference to FIGS. 11 and 11A, the electric motors 20A and 20B include an output shaft 92 that drives ninety degree spur gears 96A and 96B (FIG. 11A). The spur gear 96A drives a shaft 97 having a worm gear 98 fixed thereto. The worm gear 98 engages a pinion gear 99 to thereby rotate shaft 100. Shaft 100 is fixed to upper rim section 12 or lower rim section 14 to thereby rotate the upper or lower rim section 12 or 14. For example, as shown in FIG.

11, a first electric motor 20A may be configured to drive a ninety degree gear box 90A to rotate a shaft 100A to rotate upper rim section 12, and a second electric motor 20B may be configured to rotate a shaft 100B to thereby rotate the lower rim section 14. Electric motors 20A, 20B of FIG. 11 may be operably connected to controller 30.

Figure 12:
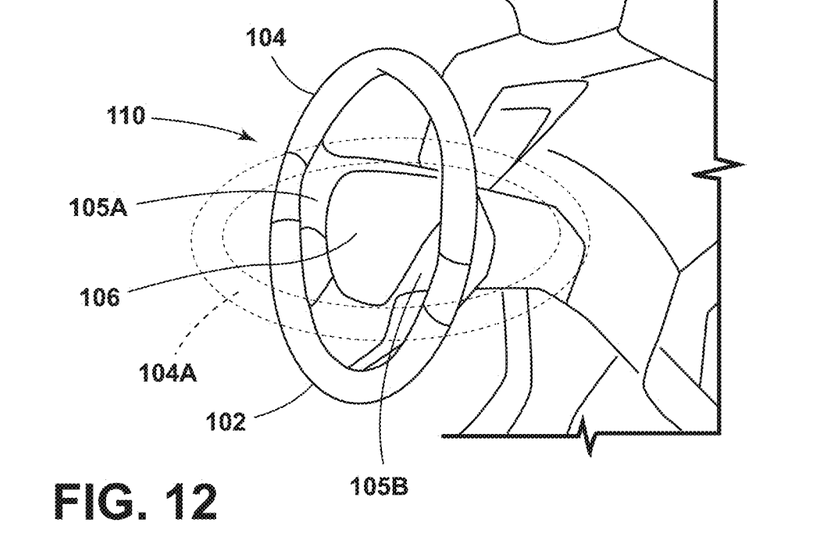
FIG. 12 is a partially fragmentary isometric view of a folding steering wheel having a substantially continuous rim.
Figure 13:
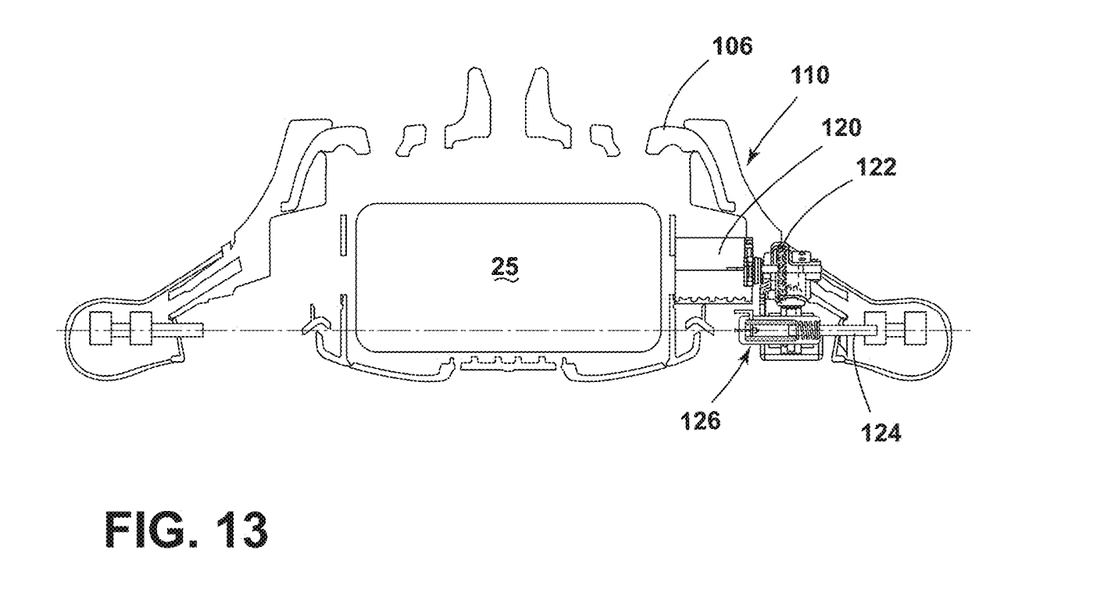
FIG. 13 is a cross-sectional view of the steering wheel of FIG. 12.

With further reference to FIGS. 12 and 13, a steering wheel system 110 according to another aspect of the present disclosure includes a steering wheel 102 having a rim 104 that is substantially rigid and continuous. The rim 104 is connected to a central structure 106 by one or more spokes 105A and 105B. The rim 104 can be rotated to a substantially horizontal or stowed position 104A shown in dashed lines in FIG. 12, or to various intermediate positions between the driving position shown in solid lines in FIG. 12 and the stowed position 104A. An electric motor 120 (FIG. 13) may be configured to drive a ninety degree gear box 122 to thereby rotate a shaft 124 to thereby rotate the rim 104 from an upright use position (FIG. 12) to a horizontal stowed position 104A, and back. A solenoid lock assembly 126 may be utilized to lock the continuous rim 104 in a selected position. Solenoid lock assembly 126 may be substantially similar to one or more of the solenoid mechanisms of FIG. 15A, 15B, or 15C. Also, the electric motor 120 may be configured to rotate the rim 104 utilizing an inline gear drive (see e.g. FIGS. 9A, 9B) rather than a ninety degree drive 122.

Unlike the steering wheel systems 1A-1D, the steering wheel system 110 includes a rim 104 that is substantially rigid and continuous (i.e. not folding), such that the entire rim 104 rotates upon actuation of the electric motor 120.

Figure 14:
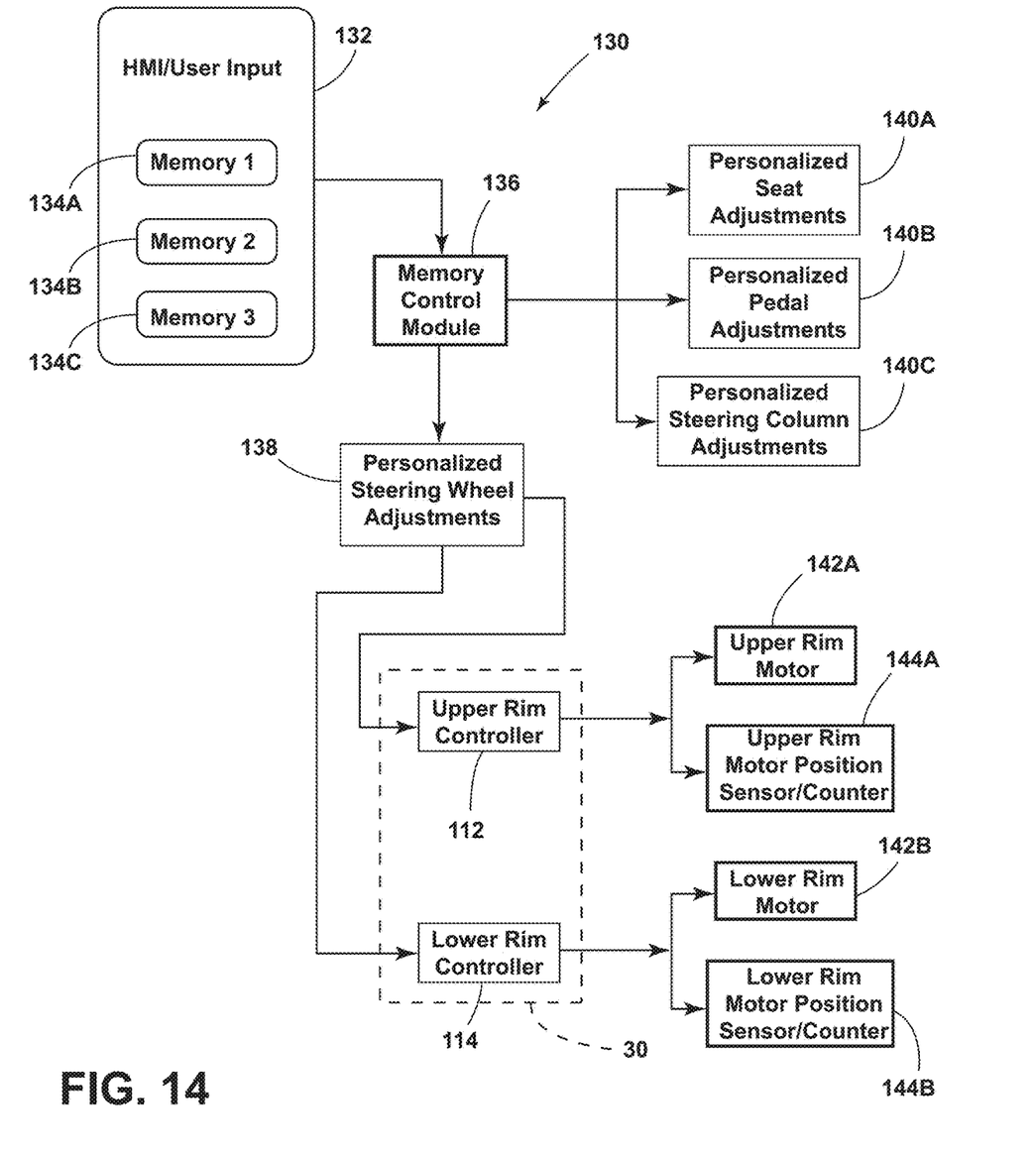
FIG. 14 is a schematic showing operation of the system.

With further reference to FIG. 14, any of the steering wheel systems described above may include a control system 130 including an HMI/user input 132 including memory storage 134A-134C. HMI/user input 132 may comprise buttons 28A, 28B (FIG. 1), a touch screen (not shown), a smartphone 22 (FIG. 2), a computing device 22B, a touch screen on a vehicle dashboard (not shown), voice recognition device, or other suitable input. A memory control module 136 receives memory 134A-134C from input 132, and provides for personalized seat, pedal, and steering column adjustments 140A-140C. The memory control module 136 also provides personalized steering wheel adjustments 138 that are utilized by upper rim controller 112 and lower rim controller 114 to drive upper and lower rim motors 142A and 142B, respectively. It will be understood that controllers 112 and/or 114 may comprise part of controller 30. Upper and lower sensors 144A and 144B provide position data concerning the position of the upper and lower rim sections 12 and 14, respectively, whereby the upper and lower rim controllers 112 and 114, respectively, can position the upper and lower rim sections 12 and 14 at a desired angular position. Sensors 144A and 144B may comprise, for example, encoders or other suitable sensors that are operably connected to motors 20A, 20B and/or another moving component. It will be understood that various controllers, sensors, and electric or other powered drive arrangements may be utilized, and the present disclosure is not limited to any specific configuration. In particular, the arrangement of FIG. 14 is a schematic diagram showing one possible approach.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A powered folding steering wheel system, comprising:
a steering wheel having a primary structure and a rim forming a substantially continuous ring that is pivotably connected to the primary structure;
an electric motor that is configured to rotate the rim from an upright use position to a substantially horizontal stowed position.

2. The powered folding steering wheel system of claim 1, wherein:
the steering wheel includes an airbag module;
the airbag module is deactivated when the rim moves from the use position to the stowed position.

3. A powered folding steering wheel system comprising:
a steering wheel having a primary structure comprising a central portion and spokes, wherein the central portion that is configured to mount to a steering column forward of the steering wheel, the steering wheel including a rim connected to the central portion by the spokes, wherein the rim includes an upper rim section having opposite ends pivotably connected to the primary structure to permit rotation forwardly and rearwardly from a driving position of the upper rim section, and a lower rim section having opposite ends pivotably connected to the primary structure to permit rotation forwardly and rearwardly from a driving position of the lower rim section, wherein the upper and lower sections are substantially coplanar when the upper and lower rim sections are in the driving positions;
an electrically powered drive assembly configured to independently rotate the upper and lower rim sections forwardly and rearwardly from their respective driving positions, whereby the upper and lower rim sections can be: a) simultaneously positioned in their respective forward positions, b) simultaneously positioned in their respective rearward positions, and c) simultaneously positioned in their respective driving positions.

4. The powered folding steering wheel system of claim 3, wherein:
the electrically powered drive assembly includes a first electric motor that is operably connected to the upper rim section, and a second electric motor that is operably connected to the lower rim section.

5. The powered folding steering wheel system of claim 4, including:
first and second ninety degree gear drives operably interconnecting the first and second electric motors to the upper and lower rim sections, respectively.

6. The powered folding steering wheel system of claim 5, wherein:
the first and second ninety degree gear drives each includes a worm gear that engages a pinion gear such that the upper and lower rim sections remain at a selected position when the first and second electric motors are not actuated.

7. The powered folding steering wheel system of claim 6, wherein:
the first and second ninety degree gear drives include first and second pinion gears, respectively, and the first pinion gear is connected to a first shaft whereby rotation of the first shaft causes rotation of the upper rim section, and wherein the second pinion gear is connected to a second shaft whereby rotation of the second shaft causes rotation of the lower rim section.

8. The powered folding steering wheel system of claim 4, including:

first and second inline gear drives operably interconnecting the first and second electric motors to the upper and lower rim sections, respectively.

9. The powered folding steering wheel system of claim 3, wherein:
the lower rim section can be rotated rearwardly to a substantially horizontal support position while the upper rim section remains in an upright driving position to thereby support an article on the lower rim section.

10. The powered folding steering wheel system of claim 3, wherein:
the lower rim section can be rotated rearwardly to a substantially horizontal support position while the upper rim section is rotated rearwardly to a position that is in a range of about 10-degrees to about 30 degrees relative to the lower rim section.

11. The powered folding steering wheel system of claim 3, wherein:
the upper and lower rim sections can be rotated forwardly to stowage positions whereby the upper and lower rim sections are disposed at an acute angle relative to one another.

12. The powered folding steering wheel system of claim 3, including:
first and second powered locking mechanisms that are configured to lock the upper and lower rim sections, respectively, in the respective driving positions thereof.

13. The powered folding steering wheel system of claim 12, wherein:
the first and second powered locking mechanisms comprise solenoids that shift pins between locked and unlocked positions.

14. The powered folding steering wheel system of claim 12, wherein:
the central portion of the steering wheel includes an airbag module;
the first and second powered locking mechanisms are configured to generate a signal to deactivate the airbag module if the first and second powered locking mechanisms are not locked.

15. The powered folding steering wheel system of claim 3, wherein:
at least a selected one of the upper and lower rim sections is operably interconnected to the primary structure by a ratchet mechanism having at least one releasable pawl that permits rotation of the selected rim section in only a first direction when the pawl is engaged.

16. The powered folding steering wheel system of claim 3, wherein:
at least a selected one of the upper and lower rim sections is operably interconnected to the primary structure by a ratchet mechanism having first and second releasable pawls that can be selectively engaged to a) prevent rotation of the selected rim section in first and second opposite directions, b) prevent rotation of the selected rim section in only the first direction, and c) prevent rotation of the selected rim section in only the second direction.

17. The powered folding steering wheel system of claim 3, wherein:
the spokes have outer ends that are disposed at 9 and 3 o'clock positions of the rim when the steering wheel is in a centered position.

18. The powered folding steering wheel system of claim 3, including:
a user input;
a controller operably connected to the user input, wherein the controller is configured to utilize a plurality of stored steering wheel configurations whereby a user can select a desired steering wheel configuration using the user input to thereby cause the controller to shift the steering wheel to the desired steering wheel configuration.

19. The powered folding steering wheel system of claim 18, wherein:
a forward side of the primary structure is configured to mount to a steering column, and wherein during rotation of the rim from the use position to the stowed position, an upper portion of the rim moves forwardly while a bottom portion of the rim moves rearwardly.

20. A method of configuring a powered steering wheel, the method comprising:
providing a steering wheel assembly including a rim having upper and lower sections that pivot relative to a central portion of the steering wheel assembly;
storing a plurality of unique steering wheel configurations;
providing a user interface that permits a user to select one of the unique stored steering wheel configurations; and
utilizing a controller to actuate a powered drive system to cause the upper and lower rim sections to move unequal distances from a substantially coplanar driving configuration to positions corresponding to the user-selected one of the steering wheel configurations.

* * * * *